W. PITMAN & C. F. JACOBSON.
GAME APPARATUS.
No. 186,872. Patented Jan. 30, 1877.
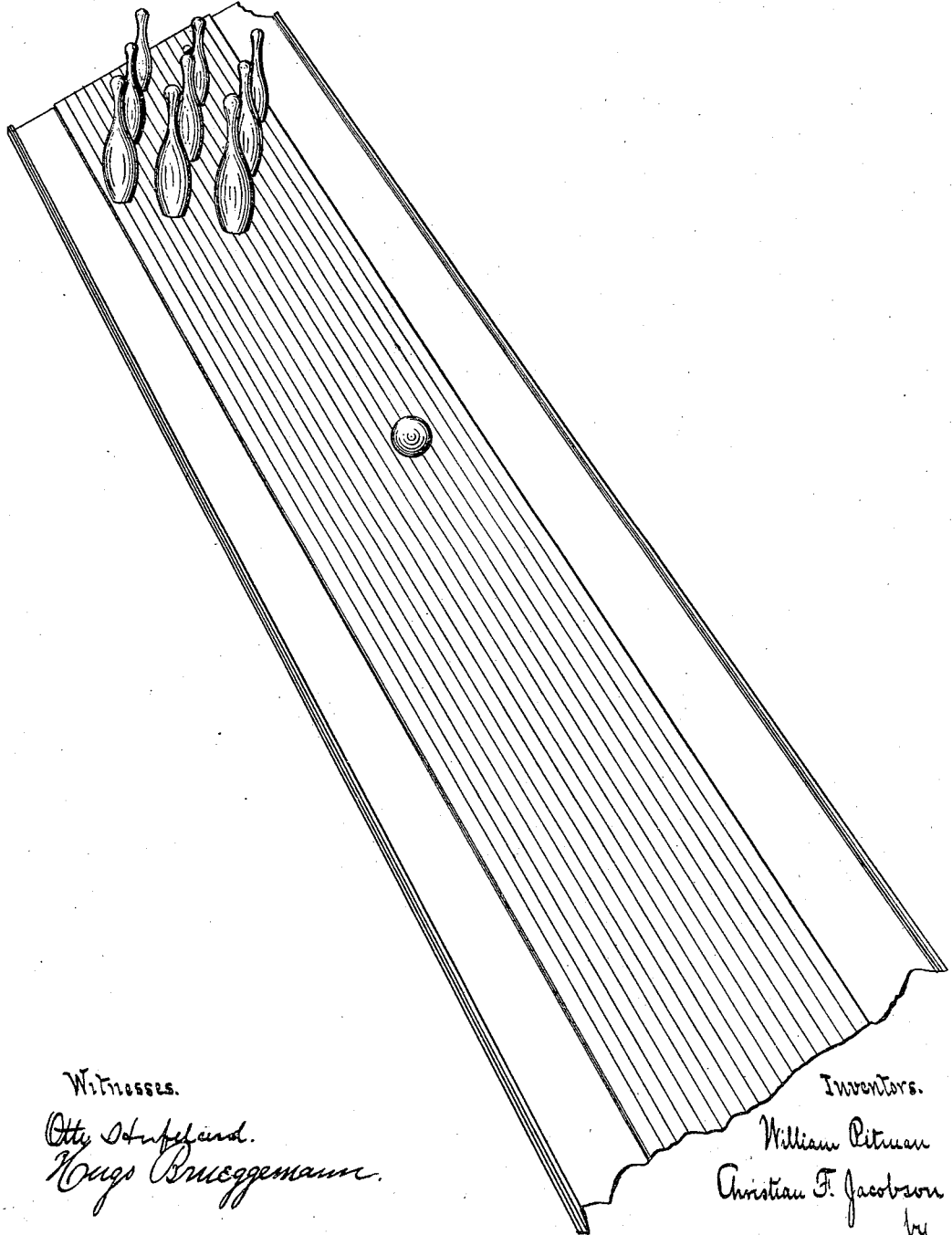

UNITED STATES PATENT OFFICE.

WILLIAM PITMAN AND CHRISTIAN F. JACOBSON, OF NEW YORK, N. Y.

IMPROVEMENT IN GAME APPARATUS.

Specification forming part of Letters Patent No. 186,872, dated January 30, 1877; application filed September 26, 1876.

*To all whom it may concern:*

Be it known that we, WILLIAM PITMAN and CHRISTIAN F. JACOBSON, both of the city, county, and State of New York, have invented a new and useful Improvement in the Game of Ten-Pins, which invention is fully set forth in the following specification:

Our invention consists in a set of ten-pins made of a soft and elastic material, such as vulcanized india-rubber or a compound of rubber with lead, zinc, or other equivalent material, in combination with a set of balls made of similar materials, so that the noise produced by the use of the ordinary wooden balls and pins is deadened, and the injury produced by the concussion of the ordinary wooden balls and pins with each other and with the alley, is materially reduced or entirely avoided.

The balls and pins usually employed for the game of ten-pins are made of wood, and it is a well-known fact that by the use of such wooden balls and pins a very disagreeable noise is produced, so much so that a ten-pin alley in close proximity to a dwelling-house is considered a nuisance, and in very few districts in a well-regulated city a ten-pin alley is tolerated. Furthermore, the heavy wooden balls in being thrown down upon the alley produce such concussions that the alley very soon wears out and has to be repaired at short intervals, and by the concussions of the balls with the pins, and of the pins with each other, both the balls and the pins are liable to become injured.

All these disadvantages we have avoided by our noiseless balls and pins. A ball made of elastic india-rubber or other equivalent material, even if made as heavy as the ordinary wooden balls, will not injure the alley, and when such a ball comes in contact with pins of a similar material, neither the pins nor the balls will sustain any material injury, and particularly so little noise is produced that a bowling-alley with our noiseless pins and balls can be erected in close proximity to dwelling-houses without creating the least disturbance.

We must also remark that by using elastic balls, such as above described, on a bowling-alley, a very material saving can be effected in the construction of the alley. The alley can be made less substantial or lighter than it is when made for the ordinary wooden balls, and it requires very little if any repairs, since our noiseless balls do not injure the surface of the alley. On account of this saving in the construction and maintenance of the alley, it is of no account whatever if the original cost of our noiseless balls and pins should be greater than that of ordinary wooden balls and pins.

We are aware that a nine-pin ball has been constructed of a hollow ball of iron covered with rubber, and such, therefore, we disclaim.

What we claim as new, and desire to secure by Letters Patent, is—

A game apparatus, consisting of a set of ten-pins made of solid rubber or other soft and elastic material, and balls made of similar material, substantially as described, whereby the noise in bowling is avoided, and the wear of the bowling-alley, the pins, and balls reduced, as specified.

In testimony that we claim the foregoing we have hereunto set our hands and seals this 21st day of September, 1876.

WM. PITMAN. [L. S.]
CHR. F. JACOBSON. [L. S.]

Witnesses:
W. HAUFF,
E. F. KASTENHUBER.